(12) United States Patent
Batni et al.

(10) Patent No.: US 7,783,294 B2
(45) Date of Patent: Aug. 24, 2010

(54) APPLICATION LOAD LEVEL DETERMINATION

(75) Inventors: Ramachendra P. Batni, Phoenix, AZ (US); John R. Beasley, Cary, NC (US); Robert Brunetti, Munster, IN (US); Brian P. Davis, Apex, NC (US); Chen Fan, Beijing (CN); Nickolas Landsberg, Howell, NJ (US); Ranjan Sharma, New Albany, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1455 days.

(21) Appl. No.: 11/173,412

(22) Filed: Jun. 30, 2005

(65) Prior Publication Data

US 2007/0002732 A1  Jan. 4, 2007

(51) Int. Cl.
*H04W 72/00* (2009.01)

(52) U.S. Cl. .............. 455/453; 370/230; 370/395.2

(58) Field of Classification Search .............. None
See application file for complete search history.

(56) References Cited

U.S. PATENT DOCUMENTS

| | | | |
|---|---|---|---|
| 6,570,855 B1* | 5/2003 | Kung et al. | 370/237 |
| 7,499,453 B2* | 3/2009 | Carlson et al. | 370/395.2 |
| 2004/0047289 A1* | 3/2004 | Azami et al. | 370/230 |
| 2004/0221065 A1* | 11/2004 | Banerjee et al. | 709/250 |
| 2006/0168331 A1* | 7/2006 | Thompson et al. | 709/238 |
| 2006/0187838 A1* | 8/2006 | Alex et al. | 370/235 |

* cited by examiner

*Primary Examiner*—Ajit Patel
(74) *Attorney, Agent, or Firm*—Carmen Patti Law Group, LLC

(57) ABSTRACT

A software platform in one example comprises a plurality of software applications. The plurality of software applications comprise a first software application that performs a determination of a load level associated with the first software application. The first software application employs the determination of the load level to manage a quality of service level associated with the first software application.

18 Claims, 3 Drawing Sheets

|  204 ↓  |  206 ↓  |  208 ↓  |  210 ↓  |
| --- | --- | --- | --- |
| OPERATIONAL MODE INDICATOR | LOAD THRESHOLD | TIMER DURATION | CALL GAPPING LEVELS |
| NL | 400 | N/A | 0 |
| OL1 | 440 | 10 | 10 |
| OL2 | 500 | 5 | 25 |
| OL3 | N/A | 2 | 50 |

FIG. 2

|  304 ↓  |  306 ↓  |  308 ↓  |  310 ↓  |
| --- | --- | --- | --- |
| OPERATIONAL MODE INDICATOR | LOAD THRESHOLD | TIMER DURATION | CALL GAPPING LEVELS |
| NL | 750 | N/A | 0 |
| OL1 | 900 | 15 | 15 |
| OL2 | 1000 | 8 | 30 |
| OL3 | 1100 | 4 | 55 |
| OL4 | N/A | 1 | 70 |

FIG. 3

APPLICATION LOAD LEVEL DETERMINATION

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties:

"SCHEDULED DETERMINATION OF NETWORK RESOURCE AVAILABILITY," by Ramachendra P. Batni, Chen Fan, Ranjan Sharma, and Yu Jun Zhu, Ser. No. 10/954,573, filed Sep. 30, 2004.

"CONTROL SERVER THAT MANAGES RESOURCE SERVERS FOR SELECTED BALANCE OF LOAD," by Ramachendra P. Batni and Ranjan Sharma, Ser. No. 11/171,077, co-filed herewith.

TECHNICAL FIELD

The invention relates generally to load level management and more particularly to management of a load on a software platform.

BACKGROUND

Software platforms, for example, call processing platforms, in one example comprise a plurality of resources such as processors, memory, communication ports and/or signaling links. The call processing platform runs a plurality of call processing applications that share the plurality of resources. For example, the call processing platform allocates portions of the plurality of resources to each call processing application as needed. As a load level of the call processing platform increases, a quality of service level associated with the call processing applications is reduced. For example, as more calls are handled by the call processing applications, the plurality of resources become overloaded which increases response time and reduces the quality of service.

In known call processing platforms, the call processing platform starts in a normal operational mode and monitors the plurality of resources. If the plurality of resources become overloaded during a peak traffic period, the call processing platform manages the load level by moving into an overload mode. The call processing platform in one example starts to reject one or more of the incoming calls to reduce the load level of the call processing platform. For example, the call processing platform performs "call gapping" and/or "call throttling". However, the call processing platform is unable to determine which call processing applications are causing the overload condition. The call processing platform must perform call gapping on all incoming calls to the call processing platform. When performing call gapping on all incoming calls, the call processing platform in one example may even reject calls directed towards call processing applications that are operating well within their projected resource demands. So, the call processing platform often starves a well-behaved call processing application that is operating within engineered parameters in order to maintain an overall platform-level load control.

Thus, a need exists for an increased ability to coordinate the rejection of calls with a desired reduction of load level for a call processing platform.

SUMMARY

A software platform comprises a plurality of software applications. The quality of service provided by the plurality of software applications is managed through employment of a determination of a load level of the software applications at an application level.

In one embodiment, there is provided a software platform comprising a plurality of software applications. The plurality of software applications comprise a first software application that performs a determination of a load level associated with the first software application. The first software application employs the determination of the load level to manage a quality of service level associated with the first software application.

In another embodiment, there is provided a call processing platform A call processing platform that comprises an application server of a cellular communication network. The application server comprises a plurality of call processing applications that perform one or more of a ringback tone service, a call waiting service, and/or a voicemail service. The plurality of call processing applications comprise a first call processing application that comprises a load monitor that determines a number of calls in progress of the first call processing application. The first call processing application performs a comparison of the number of calls in progress with a plurality of predetermined load thresholds that correspond to a plurality of operational modes. The first call processing application selects a first operational mode, from the plurality of operational modes, that corresponds to the number of calls in progress. The first call processing application manages the quality of service level based on the first operational mode. The plurality of operational modes comprise a normal mode and one or more overload modes. The plurality of predetermined load thresholds comprise a normal threshold that corresponds to the normal mode, wherein the plurality of predetermined load thresholds comprise one or more overload thresholds that correspond to the plurality of overload modes. The first call processing application selects the normal mode if the number of calls in progress is less than or equal to the normal threshold. If the number of calls in progress is greater than the normal threshold, the first call processing application selects an overload mode that corresponds to a highest overload threshold, of the one or more overload thresholds, that is lower than the number of calls in progress, the first call processing application operates based on the first operational mode. If the first operational mode comprises an overload mode of the plurality of overload modes that is configured to reduce the number of calls in progress associated with the first call processing application, the first call processing application reduces the number of calls in progress to manage the quality of service level associated with the first call processing application.

In yet another embodiment, there is provided a method: a determination of a load level associated with a software application is performed at an application level. A quality of service level associated with the software application is managed through employment of the determination of the load level.

DESCRIPTION OF THE DRAWINGS

Features of exemplary implementations of the invention will become apparent from the description, the claims, and the accompanying drawings in which:

FIG. 2 is a representation of one exemplary table for a software application of the software platform of the apparatus of FIG. 1.

FIG. 3 is a representation of another exemplary table for another software application of the software platform of the apparatus of FIG. 1.

DETAILED DESCRIPTION

Figure 1:
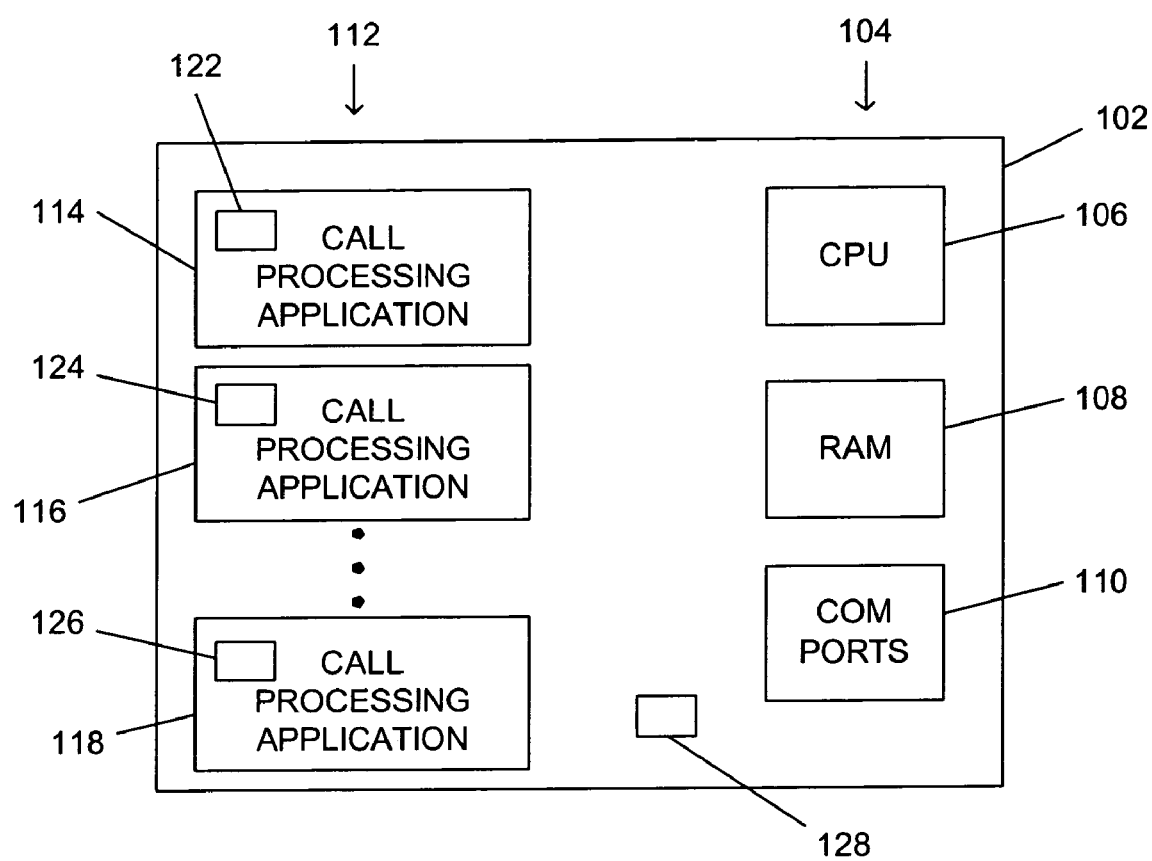
FIG. 1 is a representation of one implementation of an apparatus that comprises a software platform. The software platform comprises a plurality of resources and a plurality of software applications.

Turning to FIG. 1, an apparatus 100 in one example comprises a software platform, for example, a call processing platform 102. The call processing platform 102 in one example comprises an application server of a cellular communication network. The call processing platform comprises a plurality of resources 104. Exemplary resources comprise one or more processors 106 ("CPU"), one or more memory or storage modules 108 ("RAM"), and one or more communication ports 110 ("COM PORTS") and/or signaling links.

The call processing platform 102 comprises a plurality of x software applications, for example, call processing applications 114, 116, and 118. The plurality of call processing applications 112 in one example comprise software applications that are executed by the call processing platform 102. The plurality of call processing applications 112 provide one or more communication services to users of the call processing platform 102. The plurality of call processing applications 112 in one example provide one or more of a ringback tone service, voicemail service, media gateway, video on demand, virtual private network, pre-paid application, advanced routing service, personal number service, and/or call waiting service for subscribers to the cellular communication network. The call processing platform 102 allocates the plurality of resources to the plurality of call processing applications 112.

One or more of the plurality of call processing applications 112 comprise one or more load monitors, for example, load monitors 122, 124, and 126. For example, the call processing application 114 comprises the load monitor 122, the call processing application 116 comprises the load monitor 124, and the call processing application 118 comprises the load monitor 126. In another example, only a subportion of the plurality of call processing applications 112 comprise a load monitor.

The load monitors 122, 124, and 126 in one example comprise application level load monitors. For example, the load monitor 122 performs a determination of a load level associated with the call processing application 114 at an application level. The call processing application 114 employs the determination of the load level from the load monitor 122 to manage a quality of service level associated with the call processing application 116. The call processing application 116 employs the determination of the load level from the load monitor 124 to manage a quality of service level of the call processing application 116.

The load monitors 122, 124, and 126 perform the determinations of the load levels associated with the call processing applications 114, 116, and 118. The load monitors 122, 124, and 126 in one example employ one or more resource levels to perform the determination of the load levels. Exemplary resource levels comprise processor usage of the processor 106, memory usage of the memory modules 108, usage and/or communication throughput of the communication ports 110, and/or a number of calls in progress ("CIP"). The load monitor 122 in one example employs the processor usage and the number of calls in progress to determine the load level. In another example, the load monitor 122 performs a predetermined load test procedure to measure a load offered to it. For example, the load monitor 122 determines a response time for execution of the predetermined load test procedure.

The load monitors 122, 124, and 126 in one example perform periodic determinations of the resource levels and/or load levels. For example, the load monitor 122 measures a processor usage of the processor 106 every three seconds. At higher overload modes, the load monitor 122 in one example performs the periodic measurements at a reduced frequency to reduce a load on the call processing platform 102. For example, at overload mode OL3, the load monitor 122 measures the processor usage of the processor 106 every ten seconds. Since the periodic measurement requires a portion of the plurality of resources 104, the reduced frequency increases available resources for the services provided by the plurality of call processing applications 112, as will be appreciated by those skilled in the art.

In another example, the load monitor 122 performs the determination of the load level upon a predetermined event. For example, where the load level corresponds to a number of calls in progress, the load monitor 122 determines the load level each time a new call is handled and each time an existing call ends. If the resource levels and/or load levels reaches a predetermined trigger level, or combination of levels, the load monitor 122 in one example indicates the trigger to the call processing application 114.

Turning to FIG. 2, table 202 in one example comprises a plurality of y operational modes 203 for the call processing application 114. The plurality of operational modes 203 correspond to a plurality of operational mode indicators 204, a plurality of predetermined load thresholds 206, a plurality of predetermined timer durations 208, and a plurality of procedures 210, as described herein. The plurality of operational modes 203 in one example comprise a normal mode with indicator "NL" and a plurality of overload modes with indicators "OL1", "OL2", and "OL3". In a further example, the plurality of operational modes 203 comprise additional overload modes up to "OLn" where n is equal to y−1. The plurality of predetermined load thresholds 206 in one example comprise a normal threshold and one or more overload thresholds.

The plurality of predetermined load thresholds 206 correspond to the plurality of operational modes 203. For example, the plurality of predetermined load thresholds 206 comprise "ceilings" that separate the plurality of operational modes 203. The normal threshold comprises a ceiling for the normal mode NL and the one or more overload thresholds comprise respective ceilings for the overload modes OL1 and OL2. The predetermined load threshold 206 for the overload mode OL3 is not applicable ("N/A") because it is highest of the plurality of operational modes 203.

The call processing application 114 in one example selects an operational mode that corresponds to the load level at a particular time. For example, the call processing application 114 selects an operational mode after each determination of the load level. In one example where the load level at a first time is less than or equal to the normal threshold, the call processing application 114 selects the normal mode NL. In another example where the load level at a second time is greater than the normal threshold, the call processing application 114 selects an overload mode that corresponds to a highest overload threshold that is lower than the load level. Referring to FIG. 2, the normal threshold is "400", a first overload threshold is "440", and a second overload threshold is "500". If the load level at a particular instance of time is "390", the call processing application 114 selects the normal mode NL. If the load level at a particular instance of time is "460", the call processing application 114 selects the overload level OL2. If the load level at a particular instance of time is "720", the call processing application 114 selects the overload level OL3.

The call processing application 114 in one example employs a current and/or near real-time load level to select the operational mode. For example, the selection of the operational mode occurs within a short time delay of a determination of the load level. The time delay is relatively short compared to the changing load on the call processing application 114. The time delay for the call processing application 114 in one example is approximately one to four seconds. In a further example, the call processing application 114 employs one or more previous load levels and/or load level patterns to select the operational mode. For example, the call processing application 114 employs load levels from a previous day or month. In another example, the call processing application 114 performs a moving average of previous load levels to smooth out short-term volatility. For example, the call processing application 114 performs an average of fifty previous load levels where load levels are determined every second, as will be appreciated by those skilled in the art.

One or more of the plurality of overload modes are configured to reduce the load level associated with the call processing application 114. Upon selection of the operational mode, the call processing application 114 operates based on the procedure 210 that corresponds to the operational mode. The procedure 210 in one example comprises a call gapping procedure with call gapping levels ("CALL GAPPING LEVELS"). Call gapping in one example comprises releasing incoming calls to reduce the load level. For example, the call processing application 114 performs call gapping on none of the calls in the normal mode, ten percent of the calls in the overload mode OL1, twenty five percent of the calls in the overload mode OL2, and fifty percent of the calls in the overload mode OL3. In another example, the procedures 210 comprise call throttling procedures. Call throttling in one example comprises rejecting incoming calls over a predetermined threshold. For example, once the call processing application 114 reaches four hundred calls in progress, all additional calls are rejected until one or more calls has been completed. In yet another example, the call processing application 114 queues incoming calls instead of releasing them, as will be appreciated by those skilled in the art.

Turning to FIG. 3, table 302 in one example comprises a plurality of z operational modes 303. The plurality of operational modes 303 correspond to a plurality of operational mode indicators 304, a plurality of predetermined load thresholds 306, a plurality of predetermined timer durations 308, and a plurality of procedures 310. For example, table 302 comprises a second instance of the table 202 with the operational mode indicators 304 in place of the operational mode indicators 204, the predetermined load thresholds 306 in place of the predetermined load thresholds 206, the predetermined timer durations 308 in place of the predetermined timer durations 208, and the procedures 310 in place of the procedures 210. In a further example, the plurality of operational modes 303 comprise overload modes "OL1" up to "OLn" where n is equal to z−1. The call processing applications 114, 116, and 118 in one example employ one or more instances of the tables 202 and/or 302. For example, a plurality of call processing applications 114 employ the table 202, a plurality of call processing applications 116 employ the table 302, and a plurality of call processing applications 118 employ another instance of the table 302.

The call processing application 114 in one example selects another operational mode upon an occurrence of a predetermined event. Exemplary events comprise triggers and timer expirations. In one example, the call processing application 114 automatically escalates the operational mode to an overload mode or a higher overload mode, for example, from NL to OL1, or from OL2 to OL3. The load monitor 122 indicates to the call processing application 114 when one or more resource levels and/or load levels have reached a predetermined trigger level. For example, if the processor usage of processor 106 reaches ninety percent, the load monitor 122 causes the call processing application 114 to select the higher overload mode.

The call processing application 114 in another example performs a timed de-escalation of the operational mode. The load monitor 122 starts a predetermined timer with a predetermined timer duration 208 upon selection of the operational mode. For example, the predetermined timer expires after ten minutes in overload mode OL1, five minutes in overload mode OL2, and two minutes in overload mode OL3. The predetermined timer duration 208 of the normal mode NL is not applicable ("N/A") because it is lowest of the plurality of operational modes 203. Upon expiration of the predetermined timer, the load monitor 122 in one example performs a second determination of a second load level of the call processing application 114. The call processing application 114 performs a comparison of the second load level with the plurality of predetermined load thresholds and selects the other operational mode that corresponds to the second load level.

Figure 4:
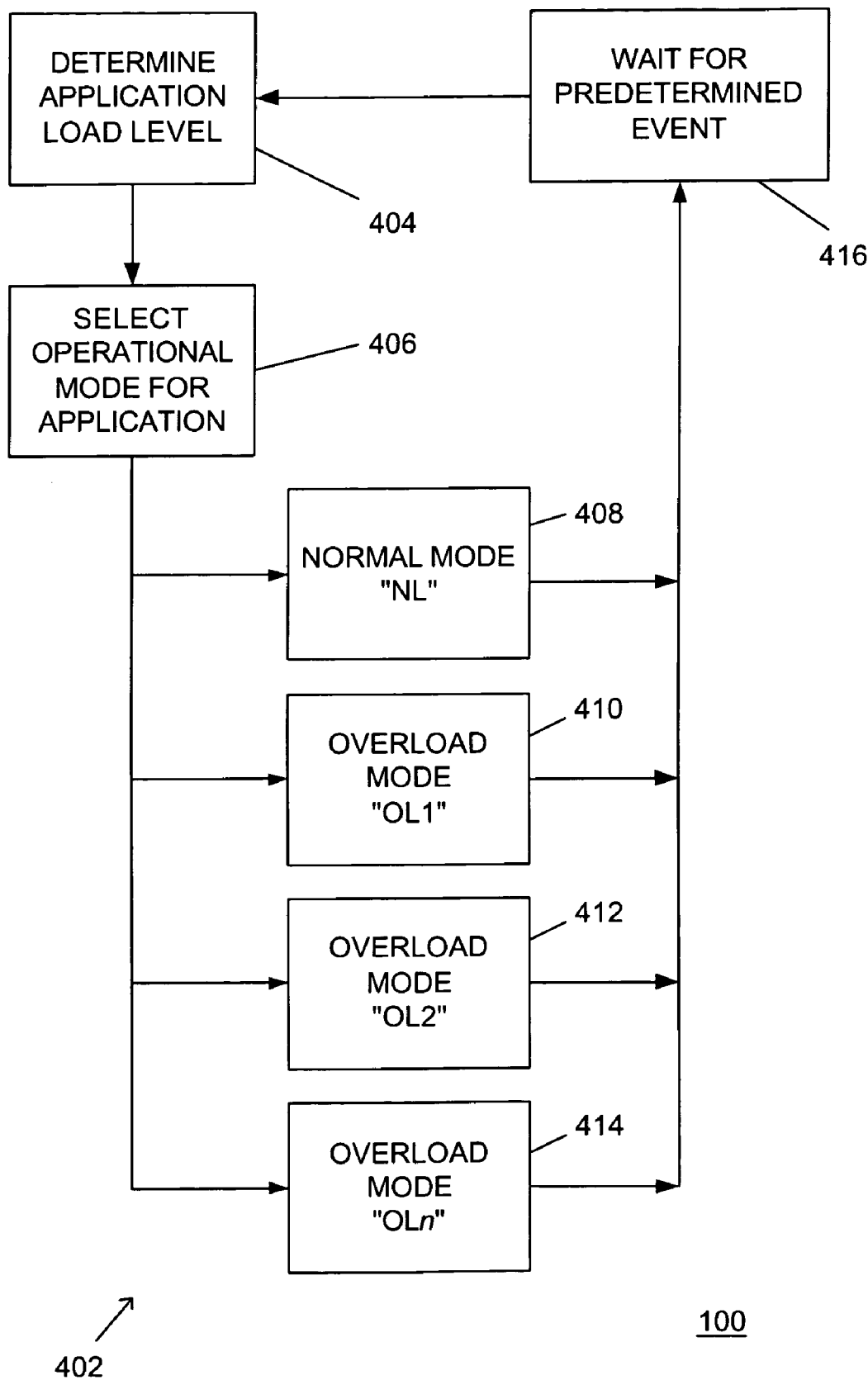
FIG. 4 is a representation of an exemplary logic flow for the software applications of FIGS. 2 and 3.

An illustrative description of an exemplary operation of the apparatus 100 is presented, for explanatory purposes. Turning to FIG. 4 and referring to FIGS. 2 and 3, one or more of the plurality of call processing applications 112, for example, the call processing application 114, follow a logic flow 402. The load monitor 122 determines (STEP 404) a first load level of the call processing application 114 at an application level. The call processing application 114 employs the first load level to select (STEP 406) an operational mode for the call processing application 114.

Upon selection of the operational mode, the call processing application 114 begins to operate based on the operational mode, for example, STEPS 408, 410, and 412 for the normal mode NL, overload mode OL1, and overload mode OL2, respectively. One or more additional STEPs 414 correspond to additional overload mode OLn, for example, the overload mode OL3 of FIG. 3. In a first example where the load level is "380", the call processing application 114 selects the normal mode NL operational mode. The call processing application 114 attempts to handle all incoming calls. In a second example where the load level is "450", the call processing application 114 selects the overload mode OL2 operational mode. The call processing application 114 performs call gapping on twenty-five percent of the incoming calls.

The call processing application 114 then waits (STEP 416) for an occurrence of a predetermined event. In a first example, the predetermined event comprises a load level trigger. For example, a load level trigger is activated when a processor usage level of the processor 106 reaches ninety percent. In a second example, the predetermined event comprises an expiration of a predetermined timer that corresponds to the current operational mode. For example, where the current operational mode comprises the overload mode OL2 of FIG. 2, the predetermined timer expires after five minutes.

Upon the occurrence of the predetermined event, the load monitor 122 performs (STEP 404) a second determination of a second load level of the call processing application 114. The call processing application 114 selects another operational mode that corresponds to the second load level (STEP 406) and continues to STEP 408, 410, 412, or 414, as will be appreciated by those skilled in the art.

Numerous alternative implementations of the present invention exist. Upon the selection of an overload mode, the call processing application 114 in one example triggers an alarm to alert service personnel that manage the call processing platform 102. A highest overload mode of the plurality of operational modes 203 in one example blocks all incoming calls to reduce a chance for a system crash. The call processing application 114 in one example requires the load level to drop substantially below a predetermined overload threshold before de-escalation. For example, the call processing application 114 enters overload mode OL1 at load level "415", but does not de-escalate to normal mode NL until the load level reaches "390" to reduce a chance for "bouncing" between operational modes. In another example, the call processing application 114 employs separate timers for escalation and de-escalation. The predetermined load thresholds 206 in another example comprise "floors" or load level ranges that separate the plurality of operational modes 203.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium 128 of the call processing platform 102. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A software platform, comprising:
a plurality of software applications, wherein the plurality of software applications comprise a first software application that performs a determination of a load level associated with the first software application;
wherein the first software application employs the determination of the load level to manage a quality of service level associated with the first software application;
wherein the first software application performs a comparison of the load level with a plurality of predetermined load thresholds that correspond to a plurality of operational modes;
wherein the first software application selects a first operational mode, from the plurality of operational modes, that corresponds to the load level;
wherein the first software application manages the quality of service level based on the first operational mode through employment of one or more of a call gapping procedure and a call throttling procedure that corresponds to the first operational mode.

2. The software platform of claim 1, wherein the software platform comprises an application server of a cellular communication network.

3. The software platform of claim 1, wherein the plurality of operational modes comprise a normal mode and one or more overload modes;
wherein the plurality of predetermined load thresholds comprises a normal threshold that corresponds to the normal mode, wherein the plurality of predetermined load thresholds comprise one or more overload thresholds that correspond to the plurality of overload modes;
wherein the first software application selects the normal mode if the load level is less than or equal to the normal threshold;
wherein if the load level is greater than the normal threshold the first software application selects an overload mode that corresponds to a highest overload threshold, of the one or more overload thresholds, that is lower than the load level.

4. The software platform of claim 3, wherein the first operational mode comprises an overload mode of the plurality of overload modes that is configured to reduce the load level associated with the first software application;
wherein the first software application operates based on the first operational mode;
wherein the first software application reduces the load level to manage the quality of service level associated with the first software application.

5. The software platform of claim 4, wherein the first operational mode comprises one or more call gapping procedures;
wherein the first software application performs the one or more call gapping procedures to manage the quality of service level associated with the first software application.

6. The software platform of claim 3, wherein the first software application selects a second operational mode upon an occurrence of a predetermined event.

7. The software platform of claim 6, wherein the predetermined event comprises an expiration of a predetermined timer that corresponds to the first operational mode;
   wherein the first software application selects the second operational mode upon the expiration of the predetermined timer that corresponds to the first operational mode.

8. The software platform of claim 6, wherein the determination of the load level comprises a first determination of a first load level;
   wherein the first software application comprises a load monitor that performs the first determination of the first load level;
   wherein the comparison of the load level with the plurality of predetermined thresholds comprises a first comparison of the first load level with the plurality of predetermined load thresholds;
   wherein the load monitor performs, upon the occurrence of the predetermined event, a second determination of a second load level associated with the first software application;
   wherein the first software application performs a second comparison of the second load level with the plurality of predetermined thresholds;
   wherein the first software application selects a second operational mode, of the plurality of operational modes, that corresponds to the second load level;
   wherein the first software application manages the quality of service level based on the second operational mode.

9. The software platform of claim 1, wherein the software application employs one or more resource level indicators to perform the determination of the load level.

10. The software platform of claim 9, wherein the one or more resource level indicators comprise resource level indicators for one or more of:
   processor usage;
   memory usage;
   communication port usage;
   response time; and/or
   calls in progress;
   wherein the software application employs the one or more resource level indicators for the processor usage, the memory usage, the communication port usage, the response time, and/or the calls in progress to perform the determination of the load level.

11. The software platform of claim 1, wherein the software application employs one or more previous load levels and/or one or more near real-time load levels to select the operational mode.

12. The software platform of claim 1, wherein the first software application performs one or more of:
   a ringback tone service;
   a call waiting service; and/or
   a voicemail service.

13. The software platform of claim 1, wherein each software application of the plurality of software applications comprises a load monitor that performs a determination of a load level associated with each software application of the plurality of software applications;
   wherein each software application of the plurality of software applications employs the determination of the load level associated with each software application of the plurality of software applications to manage a quality of service associated with each software application of the plurality of software applications.

14. A call processing platform, comprising:
   an application server, of a cellular communication network, that comprises a plurality of call processing applications that perform one or more of:
   a ringback tone service;
   a call waiting service; and/or
   a voicemail service;
   wherein the plurality of call processing applications comprise a first call processing application that comprises a load monitor that determines a number of calls in progress of the first call processing application;
   wherein the first call processing application performs a comparison of the number of calls in progress with a plurality of predetermined load thresholds that correspond to a plurality of operational modes;
   wherein the first call processing application selects a first operational mode, from the plurality of operational modes, that corresponds to the number of calls in progress;
   wherein the first call processing application manages the quality of service level based on the first operational mode;
   wherein the plurality of operational modes comprise a normal mode and one or more overload modes;
   wherein the plurality of predetermined load thresholds comprise a normal threshold that corresponds to the normal mode, wherein the plurality of predetermined load thresholds comprise one or more overload thresholds that correspond to the plurality of overload modes;
   wherein the first call processing application selects the normal mode if the number of calls in progress is less than or equal to the normal threshold;
   wherein if the number of calls in progress is greater than the normal threshold the first call processing application selects an overload mode that corresponds to a highest overload threshold, of the one or more overload thresholds, that is lower than the number of calls in progress;
   wherein the first call processing application operates based on the first operational mode;
   wherein if the first operational mode comprises an overload mode of the plurality of overload modes that is configured to reduce the number of calls in progress associated with the first call processing application, the first call processing application reduces the number of calls in progress to manage the quality of service level associated with the first call processing application.

15. The call processing platform of claim 14, wherein the load monitor selects a second operational mode upon an expiration of a predetermined timer that corresponds to the first operational mode.

16. The call processing platform of claim 15, wherein the determination of the number of calls in progress comprises a first determination of a first number of calls in progress;
   wherein the comparison of the number of calls in progress with the plurality of predetermined thresholds comprises a first comparison of the first number of calls in progress with the plurality of predetermined load thresholds;
   wherein the load monitor performs, upon the expiration of the predetermined timer, a second determination of a second number of calls in progress associated with the first call processing application;
   wherein the first call processing application performs a second comparison of the second number of calls in progress with the plurality of predetermined thresholds;

wherein the first call processing application selects the second operational mode, from the plurality of operational modes, that corresponds to the second number of calls in progress;

wherein the first call processing application manages the quality of service level based on the second operational mode.

17. A method, comprising the steps of:

performing at an application level a determination of a load level associated with a software application;

performing a comparison of the load level with a plurality of predetermined load thresholds that correspond to a plurality of operational modes for the software application;

selecting a first operational mode, from the plurality of operational modes, that corresponds to the load level;

managing a quality of service level associated with the software application based on the first operational mode through employment of one or more of a call gapping procedure and a call throttling procedure that corresponds to the first operational mode.

18. The method of claim 17, wherein the plurality of operational modes comprise a normal mode and a plurality of overload modes;

wherein the plurality of predetermined load thresholds comprises a normal threshold that corresponds to the normal mode, wherein the plurality of predetermined load thresholds comprise one or more overload thresholds that correspond to the plurality of overload modes;

wherein the step of selecting the first operational mode, of the plurality of operational modes, that corresponds to the load level comprises the steps of:

selecting the normal operational mode if the load level is less than or equal to the normal threshold;

selecting an overload mode that corresponds to a highest overload threshold, of the one or more overload thresholds, that is lower than the load level if the load level is greater than the normal threshold.

\* \* \* \* \*